(12) United States Patent
Minei et al.

(10) Patent No.: US 8,176,201 B1
(45) Date of Patent: May 8, 2012

(54) CONTROLLING THE SIGNALING OF LABEL-SWITCHED PATHS USING A LABEL DISTRIBUTION PROTOCOL EMPLOYING MESSAGES WHICH FACILITATE THE USE OF EXTERNAL PREFIXES

(75) Inventors: Ina Minei, Santa Clara, CA (US); Nischal Sheth, Sunnyvale, CA (US); Pedro R. Marques, Santa Clara, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 2086 days.

(21) Appl. No.: 10/702,184

(22) Filed: Nov. 5, 2003

(51) Int. Cl.
*G06F 15/173* (2006.01)
*G06F 15/16* (2006.01)

(52) U.S. Cl. ........ 709/238; 709/202; 709/242; 370/231; 370/389; 370/400

(58) Field of Classification Search .................. 709/206, 709/238–242, 201–203; 370/229–231, 235–236, 370/351–356, 389–392, 408–409, 400–401
See application file for complete search history.

(56) References Cited

U.S. PATENT DOCUMENTS

| | | | |
|---|---|---|---|
| 6,529,958 B1* | 3/2003 | Oba et al. .................... 709/238 |
| 6,584,071 B1* | 6/2003 | Kodialam et al. ........... 709/241 |
| 6,772,219 B1* | 8/2004 | Shobatake .................... 709/238 |
| 6,879,594 B1* | 4/2005 | Lee et al. ..................... 370/408 |
| 6,965,592 B2* | 11/2005 | Tinsley et al. ................ 370/352 |
| 7,061,921 B1* | 6/2006 | Sheth ........................... 370/389 |
| 7,120,145 B2* | 10/2006 | Ohba et al. ................... 370/389 |
| 7,151,775 B1* | 12/2006 | Renwick et al. ............. 370/400 |
| 7,197,033 B2* | 3/2007 | Reeves et al. ................ 370/389 |
| 2006/0095499 A1* | 5/2006 | Luciani et al. .............. 709/201 |

* cited by examiner

*Primary Examiner* — Bharat Barot
(74) *Attorney, Agent, or Firm* — John C. Pokotylo; Straub & Pokotylo

(57) ABSTRACT

Label distribution protocol (LDP) signaled label-switched paths (LSPs) are supported without requiring information about remote autonomous systems (ASs) to be injected into the local interior gateway protocol (IGP). This may be done by (i) decoupling a forwarding equivalency class (FEC) element from the routing information, and (ii) specifying a next hop on which the FEC relies. An LDP messaging structure (e.g., an LDP type-length-value (TLV)) that includes a label, FEC information (e.g., a host address or prefix of an egress LSR of the LSP) and a next hop (e.g., a host address or prefix of a border node, such as an AS border router (ASBR)) may be provided. This messaging structure may be included in one or more of (a) label mapping messages, (b) label withdraw messages, and (c) label release messages. If an LDP message including the expanded LDP messaging structure is received at a node, the node may determine whether or not to propagate the LSP using the next hop information, rather than the FEC information. If, on the other hand, the LDP message includes a normal LDP messaging structure, the node may determine whether or not to propagate the LSP as usual.

35 Claims, 11 Drawing Sheets

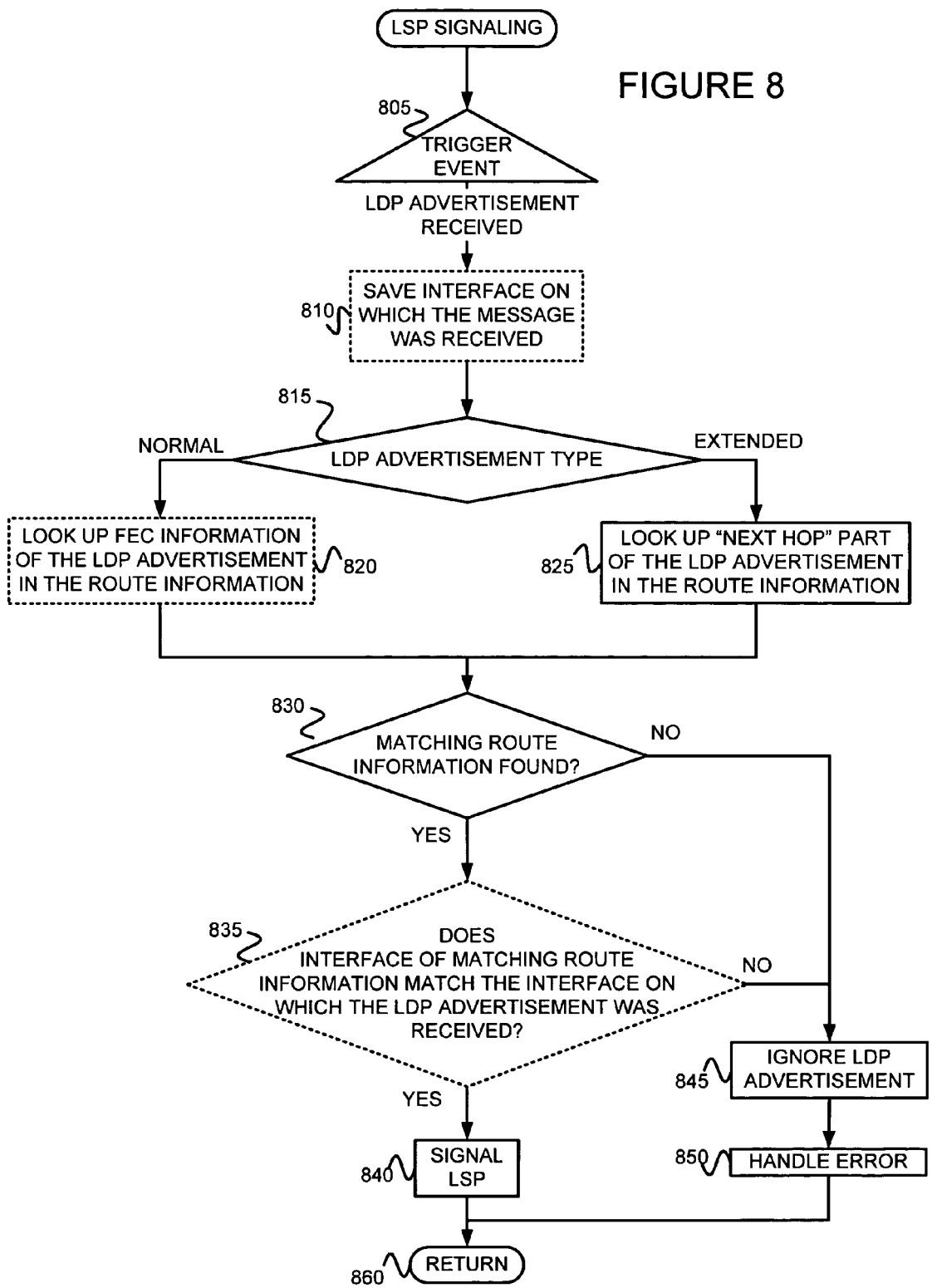

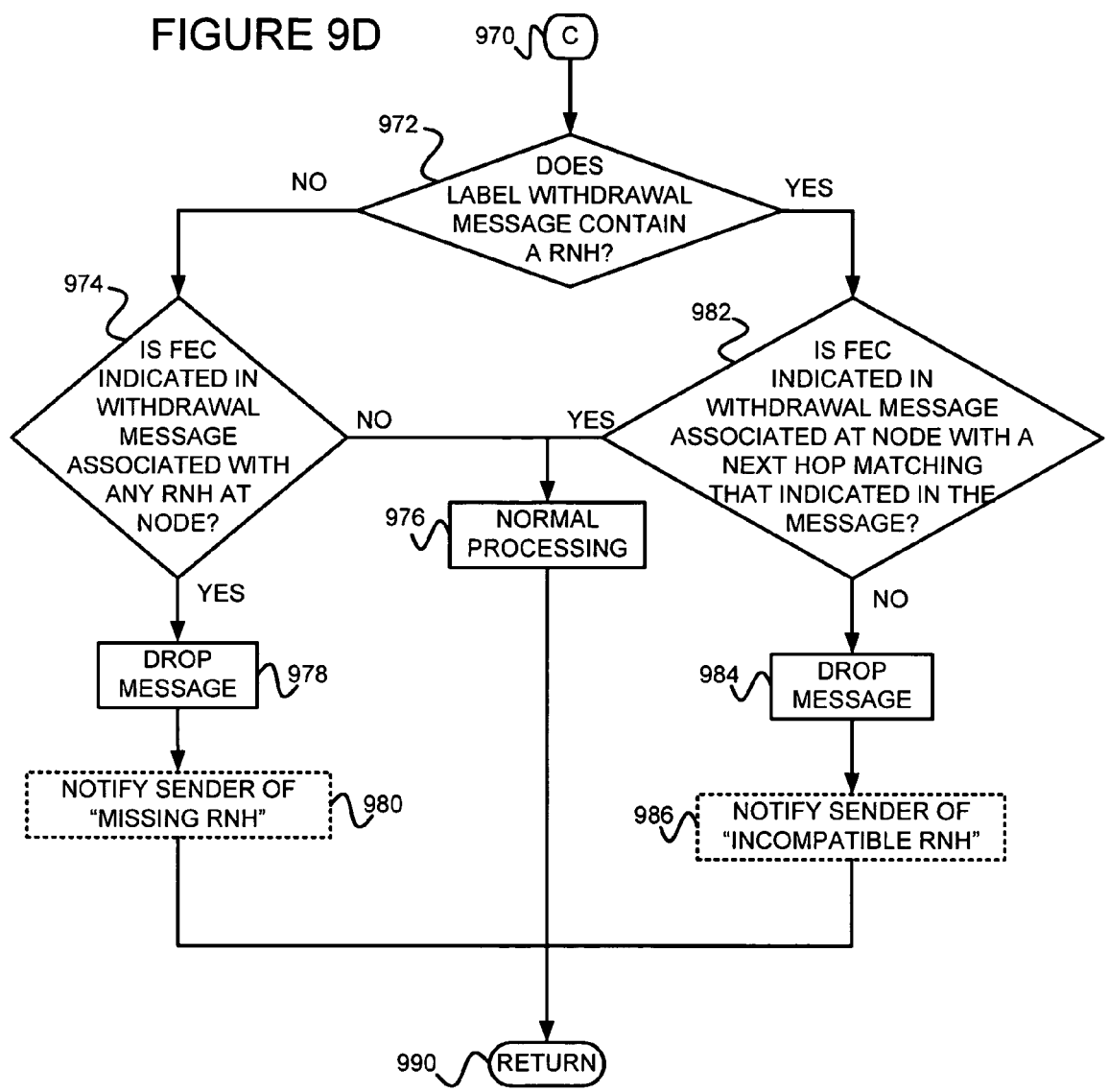

CONTROLLING THE SIGNALING OF LABEL-SWITCHED PATHS USING A LABEL DISTRIBUTION PROTOCOL EMPLOYING MESSAGES WHICH FACILITATE THE USE OF EXTERNAL PREFIXES

§1. BACKGROUND OF THE INVENTION

§1.1 Field of the Invention

The invention concerns the establishment of label-switched paths (LSPs). More specifically, the invention concerns using a label distribution protocol (LDP) in which forwarding equivalency class (FEC) elements having external prefixes or external host addresses may be used.

§1.2 Description of Related Art

The description of art in this section is not an admission that such art is prior art. Although one skilled in the art will be familiar with networking, LSPs, and protocols such as RFC 3036 LDP, each is briefly introduced below for the convenience of the less experienced reader. More specifically, the need for LSPs, as well as their operation and establishment, are introduced in §§1.2.1-1.2.3 below.

§1.2.1 The Need for Label-Switched Paths

Circuit-switched networks establish a connection between hosts (parties to a communication) for the duration of their communication ("call"). The public-switched telephone network (PSTN) is an example of a circuit-switched network, where parties to a call are provided with a connection for the duration of the call. Unfortunately, for many communications applications circuit-switched networks use network resources inefficiently. Consider, for example, the communications of short, infrequent "bursts" of data between hosts. Providing a connection for the duration of a call between such hosts simply wastes communications resources when no data is being transferred. Such inefficiencies are not a problem in packet-switched networks.

Packet-switched networks are typically made up of interconnected nodes (referred to as "routers" in the specification below, without loss of generality) for forwarding addressed data (referred to as "packets" in the specification below without loss of generality). Packets traverse the network by being forwarded from router to router until they reach their destinations, which are typically specified by so-called layer-3 addresses in the packet headers. Unlike switches, however, routers determine the destination addresses of received packets and, based on these destination addresses, determine the appropriate link on which to send them. Routers may use protocols to discover the topology of the network, and algorithms to determine the most efficient ways to forward packets towards a particular destination address or addresses. Since the network topology can change, packets destined for the same address may be routed differently. Such packets can even arrive out of sequence.

In some cases it may be considered desirable to establish a fixed path through at least a part of a packet-switched network for at least some packets. Such paths can be engineered to account for bandwidth availability and traffic characteristics. Traffic engineering permits network administrators to map traffic flows onto an existing physical topology. In this way, network administrators can move traffic flows away from congested shortest paths to a less congested path, or paths. Alternatively, paths can be determined autonomously, even on demand.

Label-switching can be used to establish a fixed LSP from a head-end node (e.g., an ingress router) to a tail-end node (e.g., an egress router). The LSP may be determined using known protocols. Once an LSP is determined, each router in the path may be configured manually, or via some signaling mechanism to forward packets to a peer (e.g., a "downstream" or "upstream" neighbor) router in the path. Routers in the path determine that a given set of packets (e.g., a flow) are to be sent over the fixed path (as opposed to being routed individually) based on unique labels added to the packets. Analogs of LSPs can also be used in circuit-switched networks. For example, generalized multiprotocol label switching (GMPLS) can be used in circuit-switched networks having switches, optical cross-connects, SONET/SDH cross-connects, etc. In multiprotocol label switching (MPLS), a label is provided explicitly in the data. However, in GMPLS, a label to be associated with data can be provided explicitly in the data, or can be inferred from something external to the data, such as a port on which the data was received, or a time slot or wavelength in which the data was carried, for example.

§1.2.2 Operations of LSPs

The operation of forwarding a packet to a next hop based on address information can be thought of as two steps—partitioning the entire set of possible packets into a set of FECs, and mapping each FEC to a next hop. From a forwarding standpoint, packets mapped to the same FEC are indistinguishable. With MPLS, which is one LSP technique, a particular packet is assigned to a particular FEC just once, as the packet enters the label-switched part of the network, referred to as the "label-switched domain." The FEC to which the packet is assigned is encoded as a label, typically a short, fixed length value. Thus, at subsequent nodes no further header analysis need be done—all subsequent forwarding over the label-switched domain is driven by the labels.

FIG. 1 illustrates LSP 110 across a network. Like LSP 110, LSPs are, in general, simplex—traffic flows in one direction from a head-end (H-E) label-switching router (LSR) 120 at an ingress edge to a tail-end (T-E) LSR 130 at an egress edge. Generally, duplex traffic requires two LSPs—one for each direction. However, some protocols support bi-directional LSPs. Notice that LSP 110 is defined by the concatenation of one or more label-switched hops, allowing a packet to be forwarded from one LSR to another across the LSP 110.

Recall that a label may be a short, fixed-length value carried in a packet's header used to identify a FEC. Alternatively, the label may be inferred from something external to the data, such as the port number on which the data was received (e.g., in the case of optical cross-connects), or the time slot in which the data was carried (e.g., in the case of SONET/SDH cross connects) of addressed data or of a cell. Recall further that, in the context of an LSP, a FEC may define a set of packets (or more generally data) that are forwarded over the same path through a network, sometimes even if their ultimate destinations are different. At the ingress edge of the network, each packet is assigned an initial label (e.g., based on all or a part of its layer 3 destination address). More specifically, referring to the example illustrated in FIG. 2, a H-E LSR 210 may interpret the destination address 220 of an unlabeled packet, perform a longest-match routing table lookup, map the packet to an FEC, assign a label 230 to the packet and forward it to the next hop in the LSP.

In the MPLS domain defined by the LSP, LSRs 220 ignore the packet's network layer header and simply forward the packet using label-swapping. More specifically, when a labeled packet arrives at an LSR, the input port number and the label are used as lookup keys into an MPLS forwarding table. When a match is found, the forwarding component retrieves the associated outgoing label, the outgoing interface (or port), and the next hop address from the forwarding table. The incoming label is replaced with the outgoing label and the packet is directed to the outgoing interface for transmission to the next hop in the LSP. FIG. 2 illustrates such label-switching by LSRs 220a and 220b.

When the labeled packet arrives at T-E LSR 240, if the next hop is not an LSR, T-E LSR 240 discards ("pops") the label and forwards the packet using conventional longest-match IP forwarding. FIG. 2 illustrates such label discarding and IP forwarding by T-E LSR 240.

§1.2.3 Establishing LSPs Using LDP

In the example illustrated with reference to FIG. 2, each LSR had appropriate forwarding labels. These labels may be provided to the LSRs using various protocols that are available, or that have been proposed for signaling labels. An example of one such protocol, LDP, is described in "LDP Specification," *Request for Comments:* 3036, the Internet Engineering Task Force (January 2001) (Incorporated herein by reference and referred to below as "RFC 3036"). With LDP-signaled LSPs, nodes establish LSPs through a network by mapping network-layer routing information directly to LSPs. More specifically, LDP associates a set of destinations, defined by route prefixes and/or router addresses with each data link LSP. This set of destinations is called the FEC. These destinations all share a common data link LSP egress and a common unicast routing path. Each LSR chooses the label advertised by the next hop for the FEC and splices it to the label it advertises to all other LSRs. This forms a tree of LSPs that converge on the T-E LSR.

FIG. 3 illustrates the binding of a label to a FEC and the communication of such label binding information among peer nodes. In this example, suppose FEC "j" defines all packets that are destined for, or should pass through, IP address 219.1.1.1. Notice that each of the nodes may be thought of as including a control component 330 and a forwarding component 310. At the edge of the LSP 390, node 240' assigns a label 3" to FEC j. This association is stored as label information 340c, as indicated by 350. Furthermore, this association is communicated to upstream node (also referred to as a "peer" or "neighbor" node) 220b' as indicated by communication 352. Node 220b' assigns its own label "100" to FEC j. This binding is similarly stored as label information 340b. Further, using the FEC j, node 220b' binds its label "100" to the received label "3", and stores them as an IN label 322b and an OUT label 324b forwarding information 320b, as indicated by 354. Furthermore, its 220b' association is communicated to upstream node (also referred to as a "peer" or "neighbor" node) 220a' as indicated by communication 356.

Node 220a' assigns its own label "500" to FEC j. This binding is similarly stored as label information 340a. Further, using FEC j, node 220a' binds its label "500" to the received label "100", and stores them as an IN label 322a and an OUT label 324a forwarding information 320a, as indicated by 358. Furthermore, its 220a' association is communicated to an upstream node (not shown) as indicated by communication 359.

This process of using the FEC to bind a label with a received label, as well as communicating a label to a peer or neighbor node, results in the establishment of an LSP, such as that illustrated in FIG. 2.

RFC 3036 describes label mapping message procedures in §3.5.7.1. In particular, this section specifies that an LSR receiving a label mapping message from a downstream LSR for a Prefix or Host Address FEC Element should not use the label for forwarding unless its routing table contains an entry that exactly matches the FEC element. This may be provided to ensure that the LDP LSP will follow the shortest path calculated by a routing protocol, and to ensure that there will be no routing loops. This requirement is not a problem when the LSP is within a single network domain (or a single autonomous system (AS)), such as the case illustrated in FIG. 4 in which an LSP is provided between provider edge devices (PE) 420, 430 in a network domain 410, to provide virtual private network (VPN) services to customer edge devices (CE) 425, 435 for example.

However, consider a case as illustrated in FIG. 5 in which an LSP is included in more than one AS 510, 520, 530. This situation may arise either in a multi-provider scenario, or in the case where a single provider has several ASs. LDP and a border gateway protocol (BGP) could be used to signal labels. However, routing information known by nodes in AS 510 might not include information about nodes in AS 520 or AS 530. The routing information could be updated to include information about nodes in other ASs (e.g., routes for LDP FECs could be injected into an IGP), but this may be undesirable. For example, in a multi-AS topology, an service provider ("SP") may not want to advertise a PE's addresses into the local IGP. Rather than using LDP and BGP, a resource reservation protocol (RSVP) could be used end-to-end. However, end-to-end RSVP is not standard and is not as scalable. Further, many network service providers are already running LDP in their networks. Another alternative solution is to use end-to-end BGP. However, this requires a three-label stack (e.g., 500:900:PE1 and some customer hardware does not support three label stacks).

In view of the foregoing, it may be desirable to allow LDP-signaled LSPs without requiring information about remote ASs (e.g., FEC element prefixes or host addresses that are external to the IGP) to be injected into the local IGP.

§2. SUMMARY OF THE INVENTION

The principles of the invention may be used to allow LDP-signaled LSPs without requiring information about remote ASs to be injected into the local IGP. For example, this may be done by (i) decoupling the FEC element from the routing information, and (ii) specifying a next hop on which the FEC relies. For example, an LDP messaging structure (e.g., an LDP type-length-value (TLV)) that includes a label, FEC information (e.g., a prefix or host address of an egress LSR of the LSP) and a next hop (e.g., a prefix or address of a border node, such as an AS border router (ASBR)) may be defined. This messaging structure may be included in one or more of (a) label mapping messages, (b) label withdraw messages, and (c) label release messages.

If an LDP message including the expanded LDP messaging structure is received at a node, the node may determine whether or not to propagate the LSP using the next hop information, rather than the FEC information. If, on the other hand, the LDP message includes a normal LDP messaging structure, the node may determine whether or not to propagate the LSP as usual.

§3. BRIEF DESCRIPTION OF THE DRAWINGS

FIG. 8 is a flow diagram of an exemplary method that may be used to process LDP signaling information in a manner consistent with principles of the invention.

FIGS. 9A-9D, collectively, are a flow diagram of an exemplary method that may be used to extend LDP signaling in a manner consistent with principles of the invention.

Figure 10:
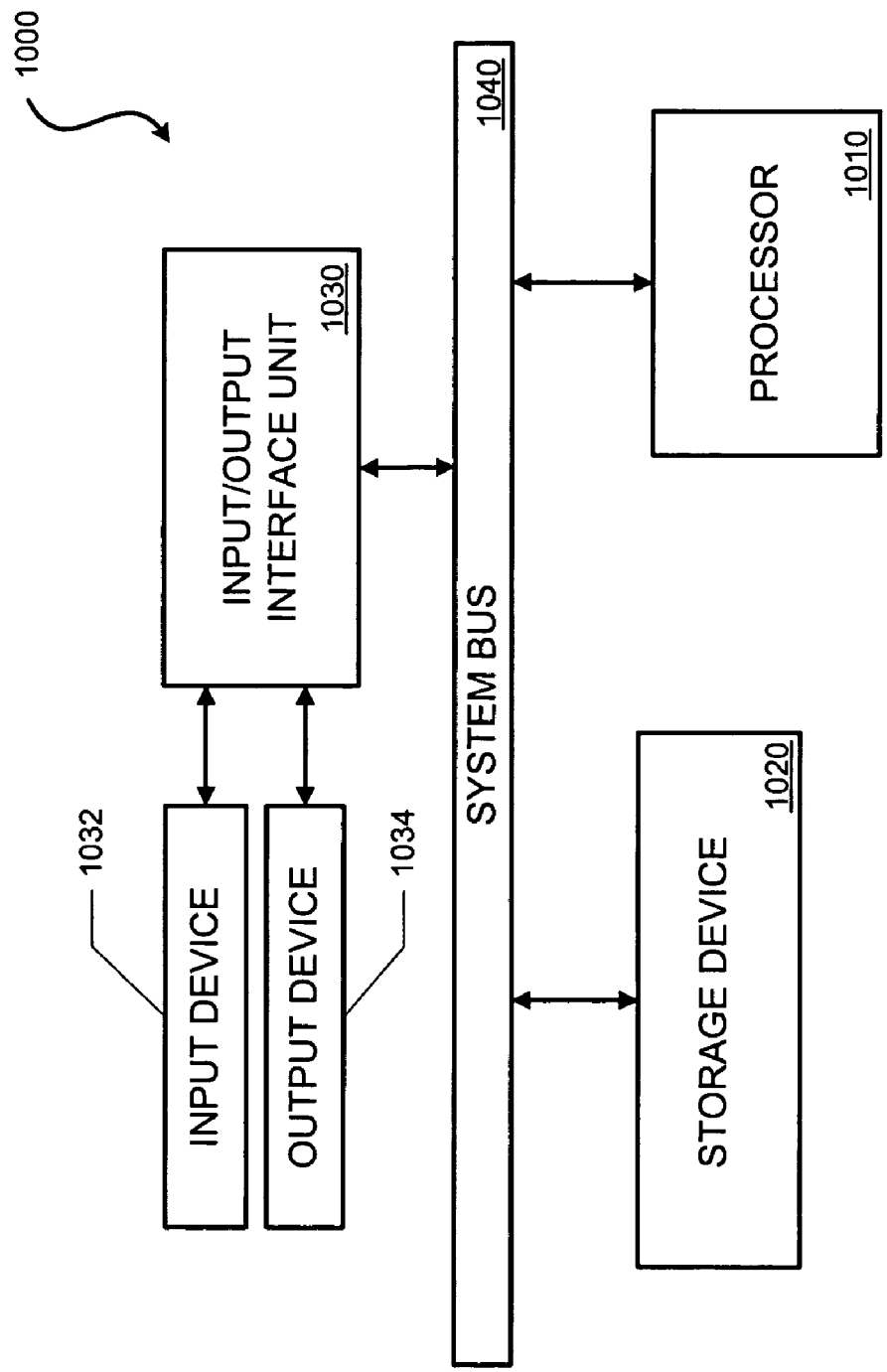

FIG. 10 is a block diagram of apparatus that may be used to perform at least some of the operations consistent with the principles of the invention, as well as store some of the information used and/or generated by the invention.

Figure 11:
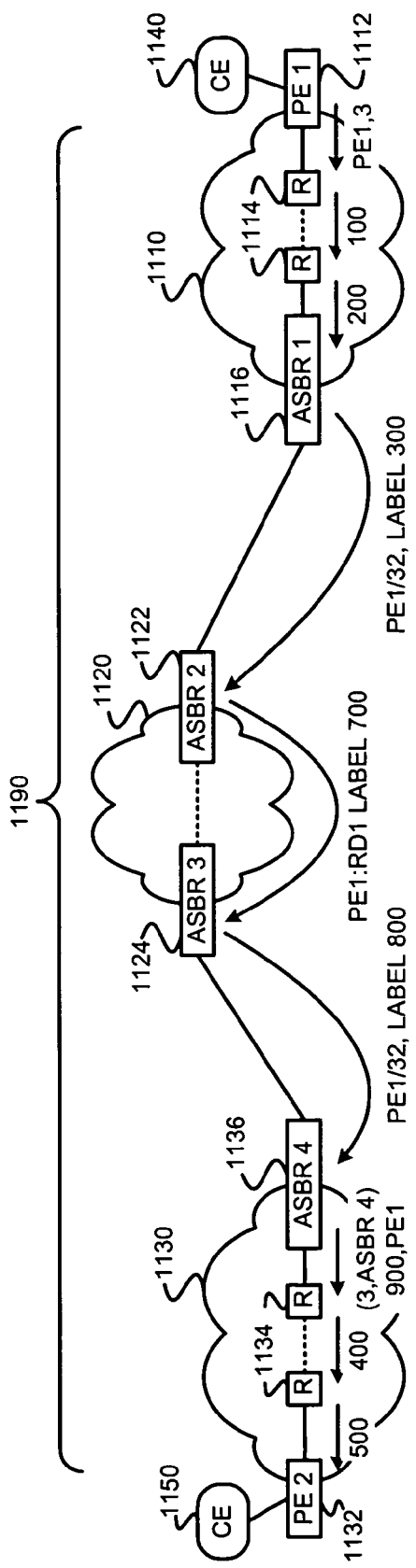

FIG. 11 illustrates one use of the invention.

§4. DETAILED DESCRIPTION

Elements, apparatus, systems, computer-implemented code, data structures and methods consistent with the principles of the invention may be used to signal LSPs. The following description is presented to enable one skilled in the art to make and use apparatus, systems, and methods consistent with the principles of the invention, and is provided in the context of particular applications and their requirements. Various modifications to the disclosed embodiments will be apparent to those skilled in the art, and the general principles set forth below may be applied to other embodiments and applications. Thus, the principles of the invention are not limited to the embodiments shown and the inventors regard their invention as the principles embodied in following disclosed methods, apparatus and data structures and any other patentable subject matter.

In the following, exemplary environments in which, or with which, the invention may operate are described in §4.1. Then, operations that may be performed by the invention are introduced in §4.2. Thereafter, exemplary apparatus, methods and data structures that may be used to perform those operations, in a manner consistent with principles of the invention, are described in §4.3. An exemplary application of the invention is described in §4.4. Finally, some conclusions regarding the invention are set forth in §4.5.

§4.1 EXEMPLARY ENVIRONMENT

The principles of the invention may be used in a communications network, or inter-network. The network may include interconnected nodes. At least some of the nodes may be apparatus for forwarding addressed data, such as routers for example. The node may be a router that supports LSPs.

Figure 1:
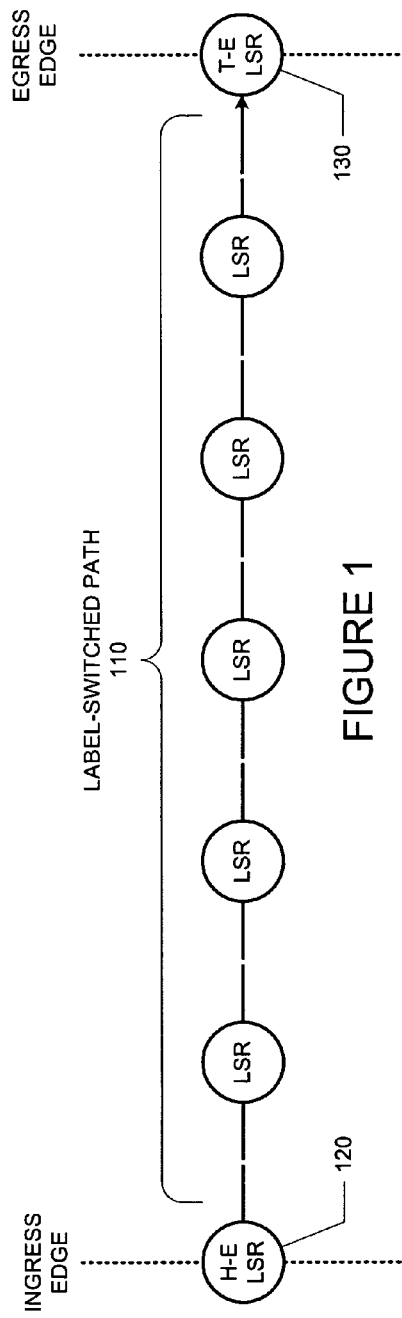
FIG. 1 illustrates an LSP including an H-E LSR, intermediate LSRs, and a T-E LSR.
Figure 2:
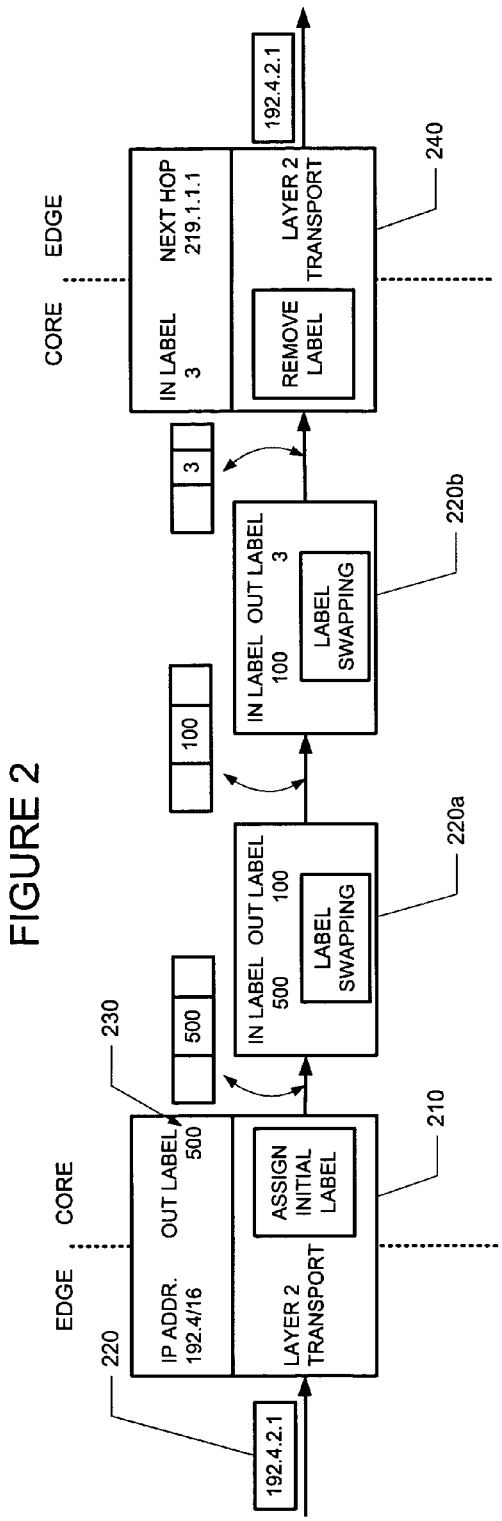
FIG. 2 illustrates label assignment, switching and removal by LSRs of an LSP.
Figure 3:
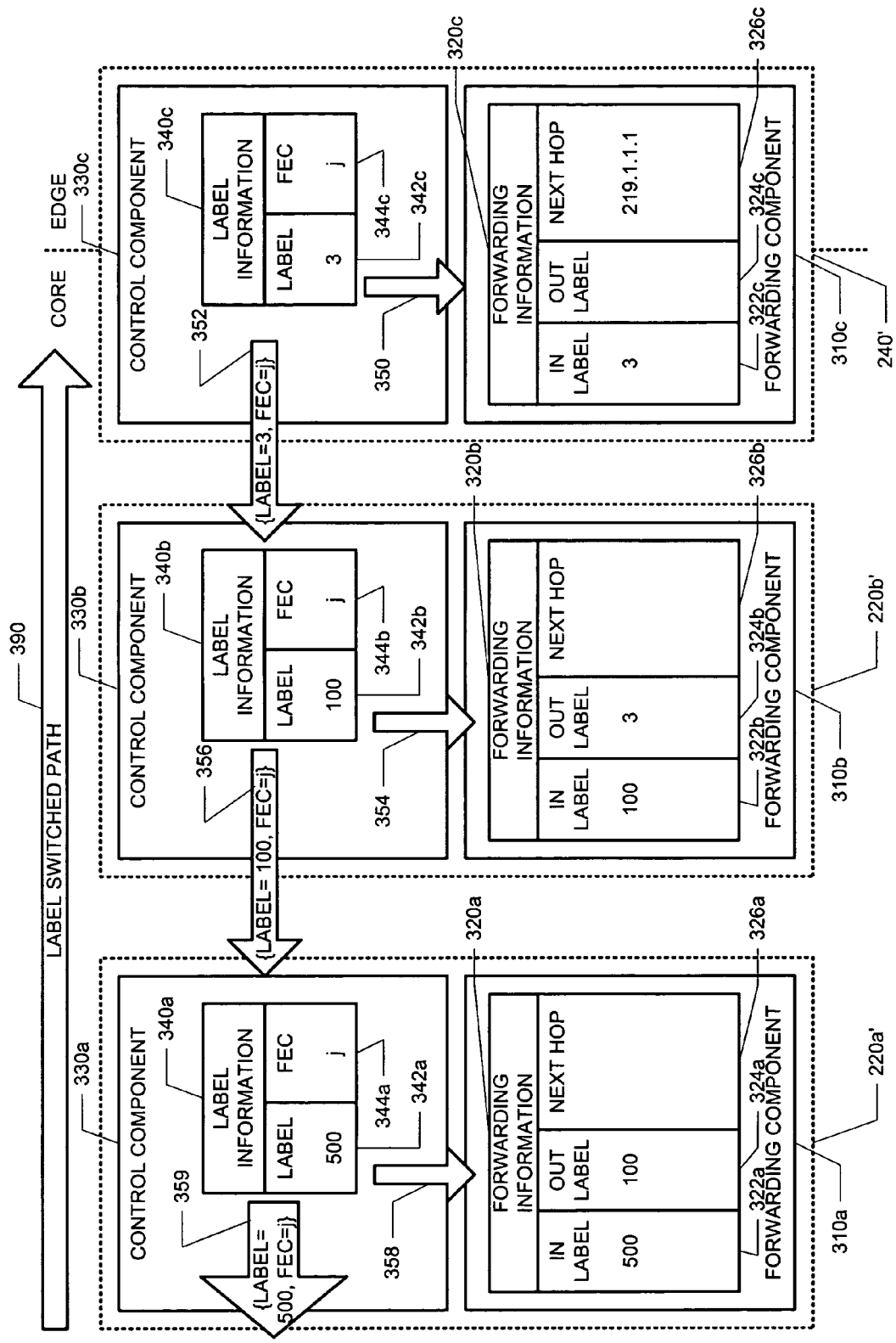
FIG. 3 illustrates the use of FECs to bind labels that may be generated and signaled by LSRs.
Figure 4:
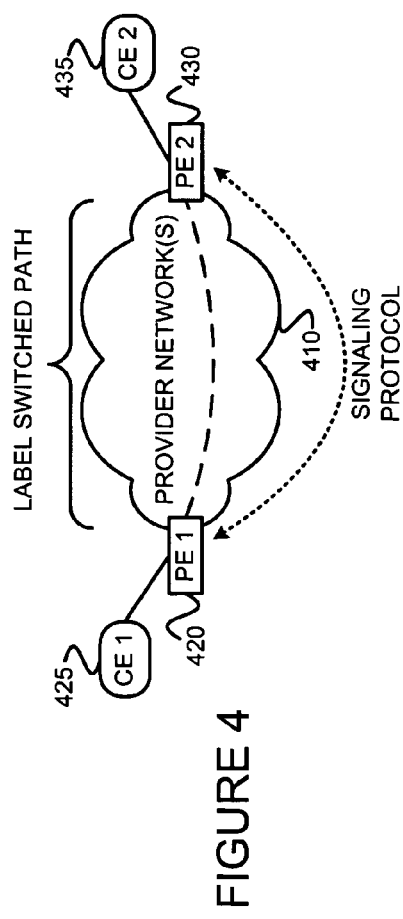
FIG. 4 illustrates a VPN application of LSPs.
Figure 5:
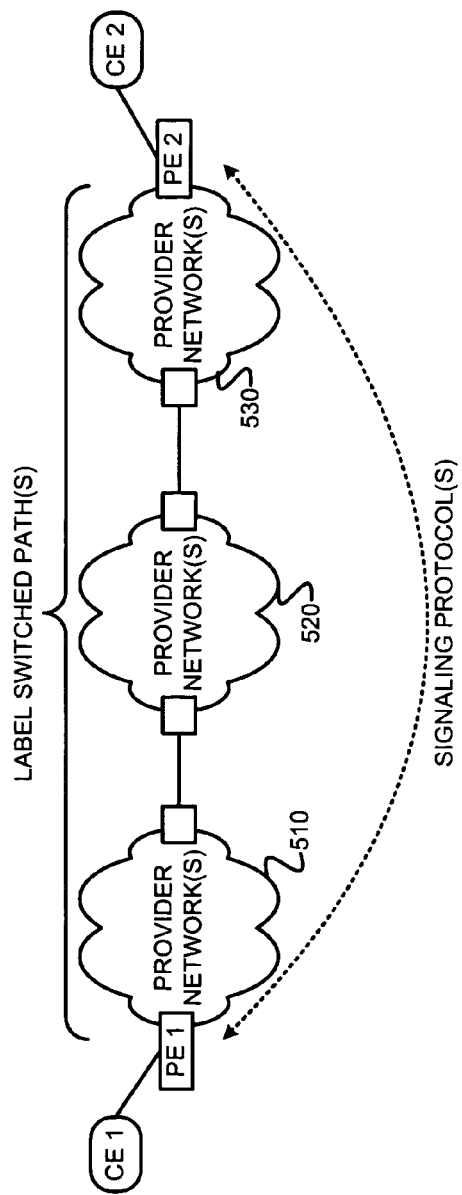
FIG. 5 illustrates a VPN application of LSPs in a topology spanning multiple ASs.
Figure 6:
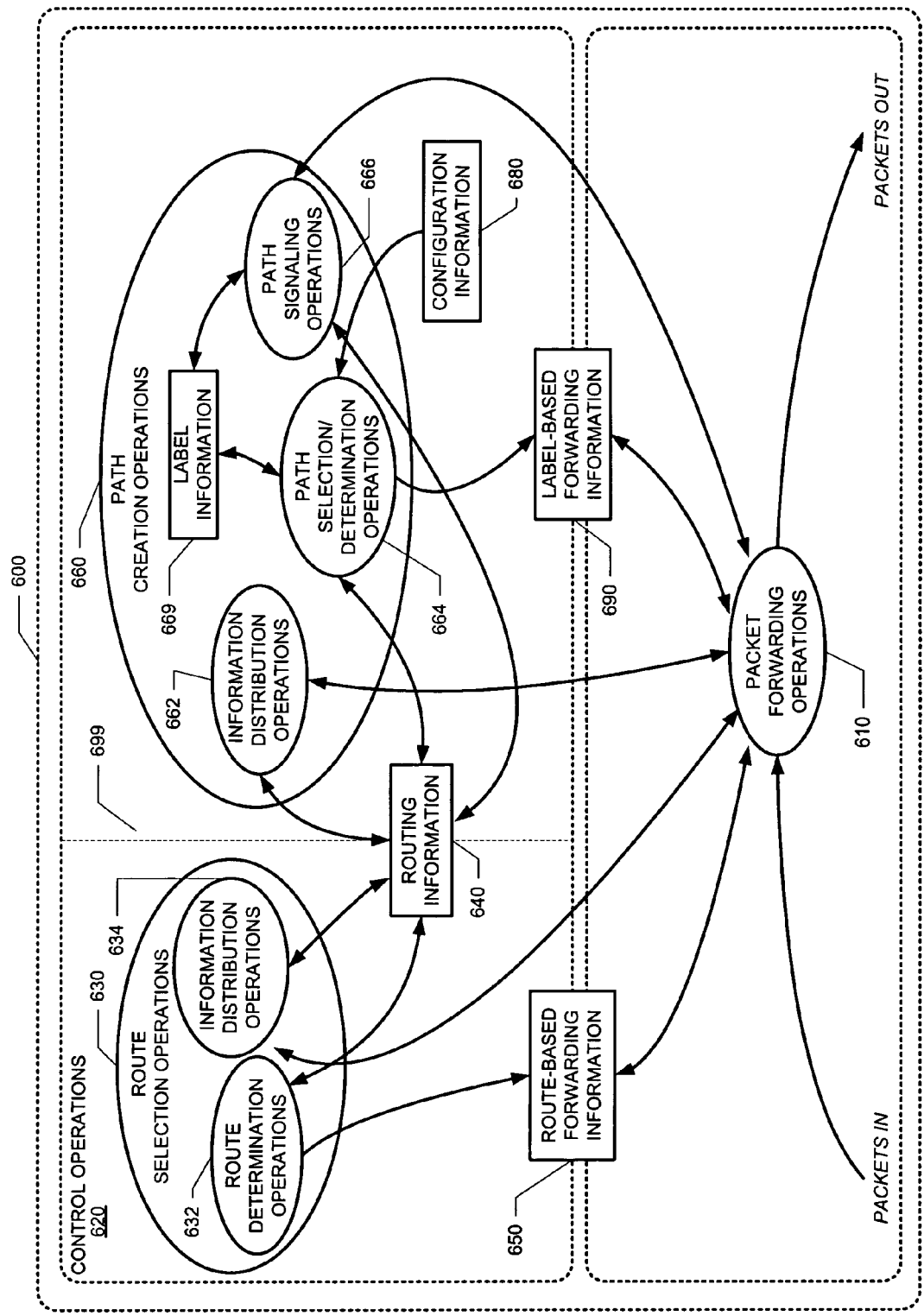
FIG. 6 is a diagram of a node, such as a router, in which or with which, the invention may be used.

FIG. 6 illustrates an exemplary router 600 in which, or with which, the principles of the invention may be used. Router 600 may include a packet forwarding operations 610 and a control (e.g., routing) operations 620. Packet forwarding operations 610 may forward received packets based on route-based forwarding information 650 and/or based on label-based forwarding information 690, such as LSP information.

Regarding control operations 620, the operations and information depicted to the right of dashed line 699 are related to creating switched paths, such as LSPs, while the operations and information depicted to the left of dashed line 699 are related to creating routes. These operations and information needn't be performed and provided, respectively, on all routers of a network.

Route selection operations 630 may include information distribution operations 634 and route determination operations 632. Information distribution operations 634 may be used to discover network topology information, store it as routing information 640, and distribute such information. Route determination operations 632 may use routing information 640 to generate route-based forwarding information 650.

The path creation operations 660 may include information distribution operations 662, path selection/determination operations 664, and path signaling operations 666. Information distribution operations 662 may be used to obtain information about the network, store such information as routing information 640, and distribute such information. Path selection/determination operations 664 may use routing information 640, label information 669, and/or configuration information 680 to generate label-based forwarding information 690, such as LSPs for example. Path signaling operations 666 may be used to accept, store and disseminate signal label-based forwarding information (e.g., paths) 669. Path signaling operations 666 may include signaling protocols, such as LDP. Recall that the path signaling operations 666, such as LDP for example, may use routing information 640. Thus, the invention is concerned with the path signaling operations 666.

§4.2 OPERATIONS THAT MAY BE PERFORMED CONSISTENT WITH PRINCIPLES OF THE INVENTION

The principles of the invention may operate to provide an LSP signaling protocol, such as an extended LDP protocol, in which FEC elements having external prefixes or external host addresses (e.g., prefixes or addresses outside a domain covered by an interior gateway protocol (IGP)) may be used.

§4.3 METHODS, DATA STRUCTURES, AND APPARATUS

The principles of the invention may be applied to LDP to provide a message including a label, FEC information, and next hop information. An LSR receiving such a message may ignore the FEC information (e.g., a prefix or address of a node from a remote AS), and use the next hop information (e.g., a prefix or address of an ASBR) instead.

§4.3.1 Exemplary Data Structures

In one embodiment consistent with principles of the invention, a new type-length-value (TLV) data structure is defined as an extension to LDP messages. The new TLV, referred to as the "resolution next hop" (RNH) TLV, may be used in label mapping, label withdraw and/or label release messages. When the RNH TLV is present in a label withdraw message or release messages, the label TLV should be present as well.

Figure 7:
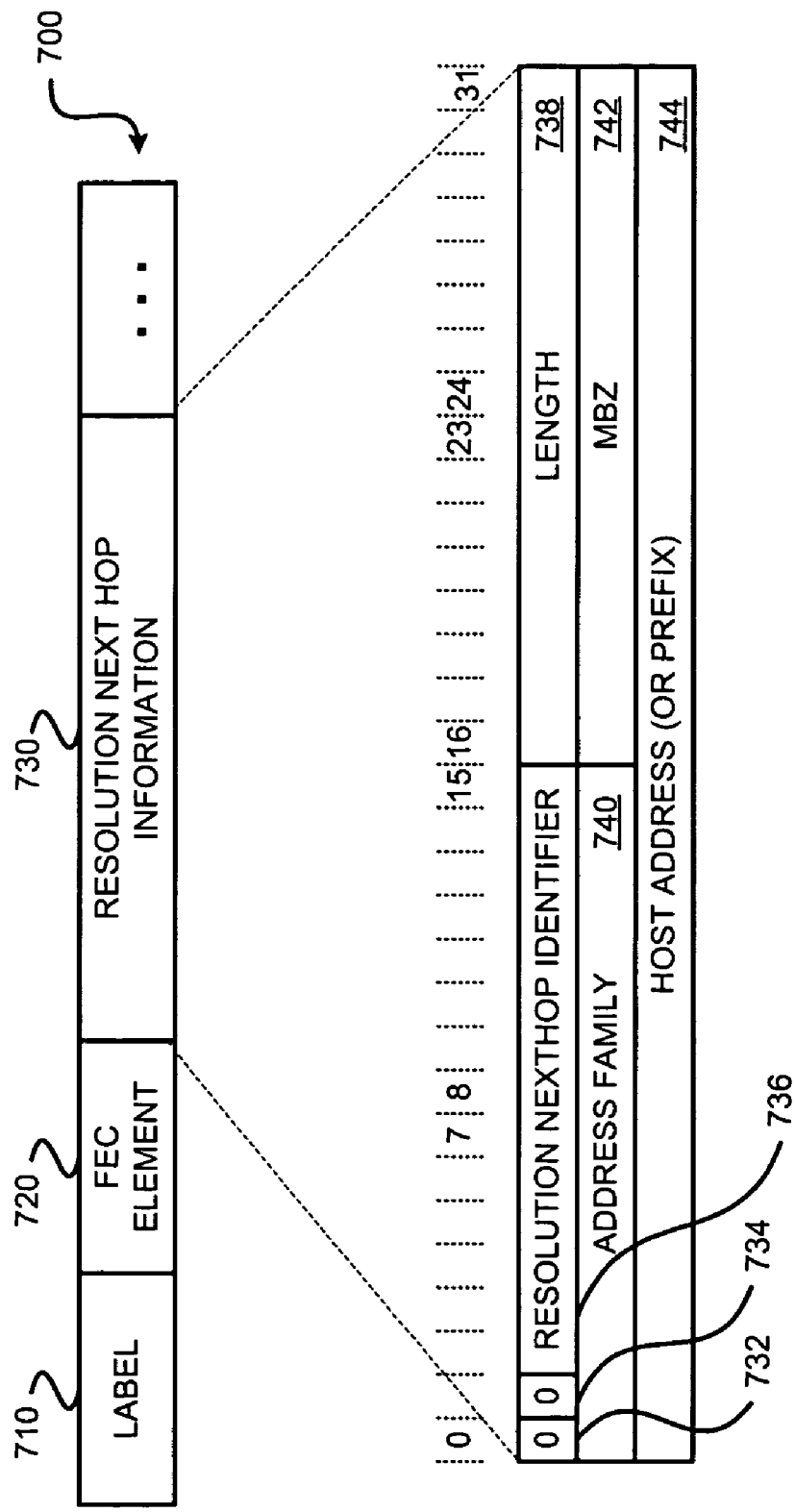
FIG. 7 illustrates an exemplary data structure that may be used to carry LDP signaling information in a manner consistent with principles of the invention.

FIG. 7 illustrates an exemplary message data structure 700, as well as an exemplary data structure for carrying RNH information. Specifically, exemplary message data structure 700 may include label information 710, FEC information 720 and RNH information 730.

In an exemplary field format consistent with the principles of the invention, RNH information 730 may include a 14-bit field 736 including an RNH identifier. Two leading zeroes 732,734 may be used to instruct nodes what to do when they don't recognize field 736. Such a mechanism may be used to ensure correct interoperability between new nodes and old nodes. Specifically, a node may interpret the "00" such that, in the event that field 736 is unrecognized, message 700 is not forwarded, and a notification is sent to the sender. This behavior is defined in RFC 3036 (the U and F bits). The RNH identifier in field 736 is a TLV type, and may be used by nodes, such as LSRs, to recognize the information 730 as RNH information. A 16-bit field 738 may include the length, in bytes of the value field of the TLV. In this case, the value field includes the address family field 740, the MBZ field 742 and the host address or prefix field 744. A 16-bit field 740 may carry address family information. Address family field 740 may contain a value from "Address Family Numbers" in RFC 1700 that encodes the address family for the address prefix in the Host Address (or Prefix) field. A must be zero (MBZ) field 742 may be used to align further fields at 4-byte boundaries. Field 744 may include a host address or prefix encoded according to address family field 740.

If a message is received that contains the RNH TLV, but does not contain a FEC TLV, the message should be dropped, and a "Missing FEC TLV" notification should be sent as discussed in greater detail in the next section. Such a notification may be used to reset the session.

§4.3.2 Exemplary Methods

FIG. 8 is a flow diagram of an exemplary method that may be used to process LDP signaling information in a manner consistent with the principles of the invention. The method may be performed on a node, such as an LSR, in a network. As indicated by trigger event block 805, acts of the method are performed when an LDP advertisement, such as a FEC-label mapping message, is received. The interface of the node on which the message was received is saved (810). The LDP advertisement type is determined (815).

If the LDP advertisement is a normal label mapping message (e.g., a message in accordance with RFC 3036, but not including RNH information), the message is processed normally. For example, the FEC information of the LDP advertisement is looked up in the route information of the node (820). If the FEC information is found in the route information of the node (830), the method continues to decision block 835. If, on the other hand, the FEC information is not found in the route information of the node (830), the LDP advertisement is ignored (845) and error handling procedures, if any, may be performed (850) before the method is left (860).

Referring back to block 815, if the LDP advertisement is an extended label mapping message consistent with the principles of the invention, the RNH part of the advertisement is looked up in the route information of the node. (825) If the RNH information is found in the route information of the node (830), the method continues to decision block 835. If, on the other hand, the RNH information is not found in the route information of the node (830), the LDP advertisement is ignored (845) and error handling procedures, if any, may be performed (850) before the method is left (860).

Note that the error handing (850) may be different for the errors occurring when processing normal LDP advertisements and errors occurring when processing extended LDP advertisements. Error handling is not strictly necessary. That is, in the event of an error, the LSP advertisement may simply be ignored.

Referring back to decision block 830, if matching route information is found (i.e., route information matches the FEC part of a normal LDP advertisement, or route information matches the RNH part of an extended LDP advertisement), it may determined whether or not the interface of the matching route information matches the interface on which the LDP advertisement was received (recall 810). (835) If not, the LDP advertisement is ignored (845) and error handling procedures, if any, may be performed (850) before the method is left (860). If, on the other hand, the interface of the matching route information matches the interface on which the LDP advertisement was received, the LSP is signaled (840) before the method is left (860). The LSP may be signaled by having the node generate and send its own label mapping message and by creating the forwarding state binding between this outgoing label and the label received.

The RNH carries the address which should be used in the decision making process of whether to install MPLS forwarding state for a particular FEC, and whether to advertise a label binding for this FEC to the neighbors. Usually, the RNH will carry the router-id of the LSR which originally injected the FEC into LDP. To install forwarding state, LDP label mapping procedures may require that a node find a routing table entry that exactly matches the FEC. When the RNH is present, the mapping procedures may be changed as detailed in the following sections.

Figure 9A:
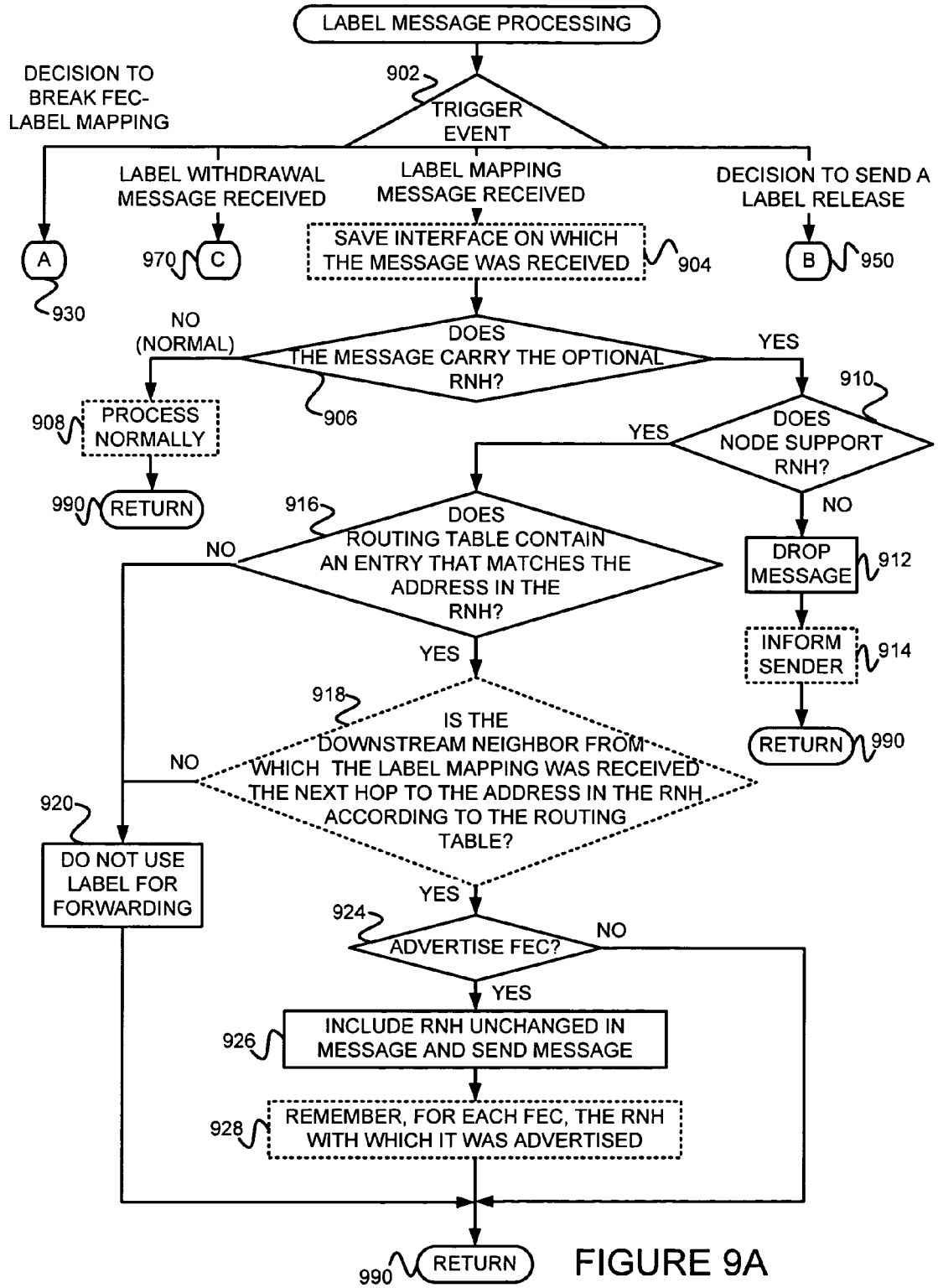

FIGS. 9A-9D, collectively, are a flow diagram of an exemplary method that may be used to extend LDP signaling in a manner consistent with principles of the invention. The method may be performed on a node, such as an LSR, in a network. Referring to FIG. 9A, the method is used to process label messages. As indicated by trigger event block 902, various branches of the method may be performed in response to various events. For example, if there is a decision (e.g., by the node itself) to break a FEC-label mapping, the method proceeds to a first branch (FIG. 9B) of the method via node A (930). If there is a decision (e.g., by the node itself) to send a label release, the method proceeds to a second branch (FIG. 9C) of the method via node B (950). If a label withdrawal message is received, the method proceeds to a third branch (FIG. 9D) of the method via node C (970). Finally, if a label mapping message is received, the acts depicted in FIG. 9A may be performed.

Still referring to FIG. 9A, if a label mapping message is received, the interface on which the message was received may be saved (904). It is determined whether or not the label mapping message carries the optional RNH information (e.g., an RNH TLV) (906). If the message does not carry the optional RNH information, the message is processed normally (e.g., in accordance with RFC 3036) (908) before the method is left (990). If, on the other hand, the message does carry the optional RNH information, it is determined whether or not the node supports RNH (910).

If the node does not support RNH, the message may be dropped (912) and the sender of the message may be notified (914) before the method is left (990). Other error processing may occur in addition to, or instead of, the acts depicted in blocks 912 and 914.

If, on the other hand, the node supports RNH, it is determined whether the routing information of the node contains an entry that matches the host address or prefix (recall, e.g., field 744 of FIG. 7) in the RNH (916). If there is no route that matches the host address or prefix in the RNH, the label is not used for forwarding (920) before the method is left (990). Error processing (not shown) may also occur. Referring back to decision block 916, if there is a route that matches the host address or prefix in the RNH information, it is determined whether the downstream neighbor, from which the label mapping message was received, is the next hop to the address or prefix in the RNH (according to the node's routing table). If not, the method proceeds to block 920, already described above. If, on the other hand, the downstream neighbor, from which the label mapping message was received, is the next hop to the address or prefix in the RNH, the node may signal the LSP by preparing and generating its own label mapping and by creating the forwarding state. For example, the method may determine whether or not to advertise the FEC. If not, the method is left (990). If, on the other hand, it is determined to advertise the FEC, the node may generate and send its own label mapping message. This label mapping message should include the RNH (unchanged) (926). For each FEC, the node should also remember the RNH with which the FEC was advertised (928) before the method is left (990). Reasons for saving this FEC-to-RNH association will become apparent in the following description.

Figure 9B:
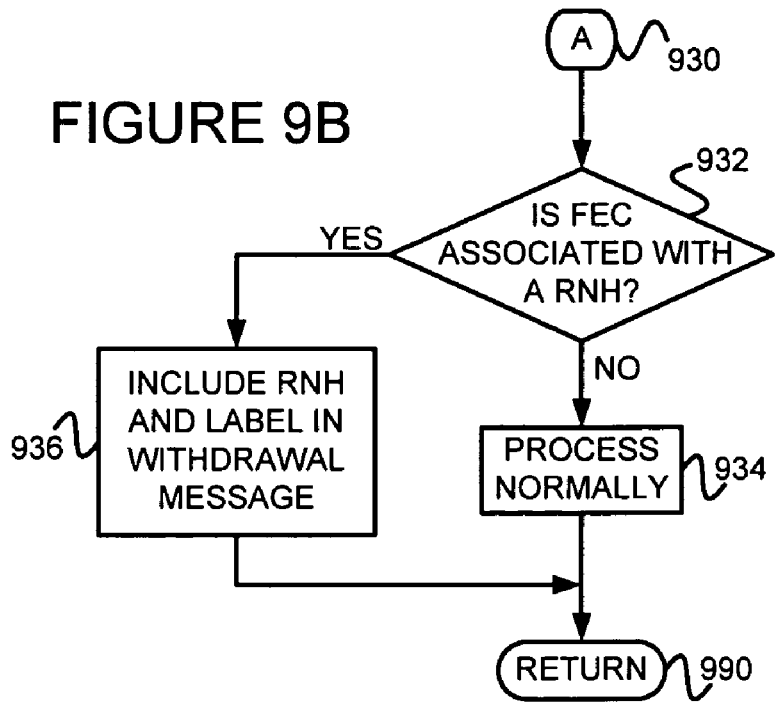

Recall that in the event of a decision to break a FEC-label mapping, the method proceeds to the acts indicated in FIG. 9B via node A (930). More specifically, it is determined whether the FEC is associated with an RNH (932). Recall from block 928 that the node should have stored any association of an RNH with a FEC. If the FEC is not associated with an RNH, normal procedures for withdrawing a FEC (e.g., those specified in RFC 3036) may be performed (934) before the method is left (990). If, on the other hand, the FEC is associated with an RNH, the RNH should be included in a withdrawal message (936) before the method is left (990).

Figure 9C:
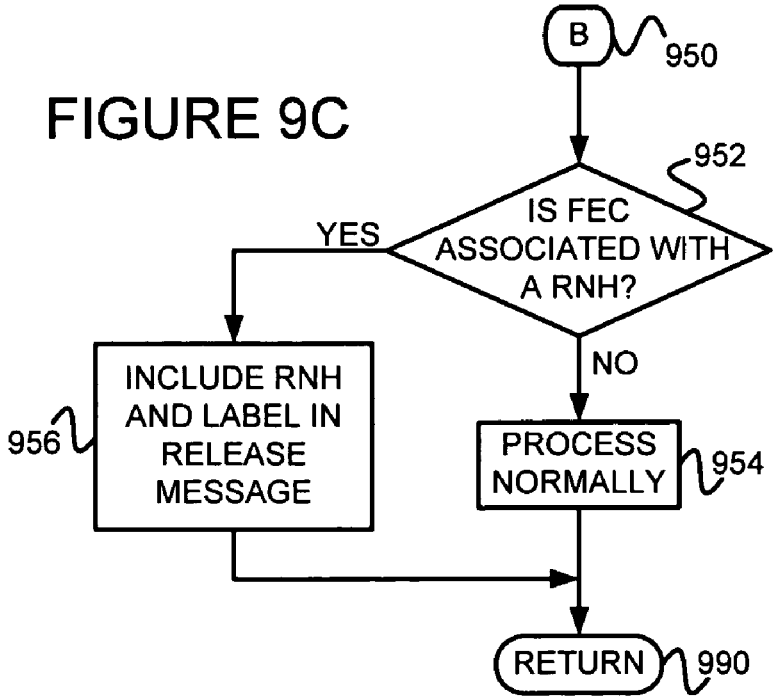

Recall that in the event of decision to send a label release, the method proceeds to the acts indicated in FIG. 9C via node B (950). More specifically, it is determined whether the FEC is associated with an RNH (952). Recall from block 928 that the node should have stored any association of an RNH with a FEC. If the FEC is not associated with an RNH, normal procedures for releasing a label (e.g., those specified in RFC 3036) may be performed (954) before the method is left (990). If, on the other hand, the FEC is associated with an RNH, the RNH should be included in a label release message (956) before the method is left (990).

Recall that in the event that a label withdrawal message is received, the method proceeds to the acts indicated in FIG. 9D via node C (970). More specifically, it is determined whether or not the label withdrawal message contains an RNH (972). If not, it is determined whether the FEC (indicated in the withdrawal message) is associated with any RNH at the node (974). If not (which should be the case), the message is processed normally (e.g., in accordance with RFC 3036) (976) before the method is left (990). If, on the other hand, the FEC is associated with an RNH at the node, error processing may occur before the method is left (990). For example, the withdrawal message may be dropped (978) and the sender may be notified of the fact that the FEC in the label withdrawal message was "missing an RNH" (980).

Referring back to decision block 972, if the label withdrawal message contains an RNH, it is determined whether the FEC (indicated in the withdrawal message) is associated at the node with a next hop matching that indicated in the message (982). If so (which should be the case), the message is processed normally (e.g., in accordance with RFC 3036) (976) before the method is left (990). If, on the other hand, the FEC is not associated with an RNH at the node, error processing may occur before the method is left (990). For example, the withdrawal message may be dropped (984) and the sender may be notified of the fact that the "RNH is incompatible" (986).

§4.3.3 Exemplary Apparatus

FIG. 10 is a block diagram of a machine 1000 which may be used to perform one or more of the operations, and to store the information described above. Machine 1000 may include a processor 1010, an input/output interface unit 1030, a storage device 1020, and a system bus 1040 for facilitating the communication of information among the coupled elements. An input device 1032 and an output device 1034 may be coupled with the input/output interface 1030. Operations consistent with principles of the invention may be performed by processor 1010 executing instructions. The instructions may be stored in storage device 1020 and/or received via input/output interface 1030. The instructions may be functionally grouped into processing modules. Although not shown, more than one of some or all of the components shown in FIG. 10 may be provided. Additionally, system bus 1040 could be any type of communications mechanism, such as a network.

Machine 1000 may be a router, for example. In an exemplary router, processor 1010 may include a microprocessor and/or (e.g., custom) integrated circuits. In the exemplary router, storage device 1020 may include one or more of ROMs, RAMs, SDRAMs, SRAMs, SSRAMs, DRAMs, flash drives, hard disk drives and flash cards. At least some of storage devices 1020 may include program instructions defining an operating system (OS), a protocol daemon, and/or other daemons. In one embodiment, methods consistent with the principles of the invention may be performed by processor 1010 executing the stored program instructions. At least a portion of the instructions may be stored (temporarily or more permanently) on storage device 1020 and/or may be received from an external source via input interface unit 1030. Finally, in the exemplary router, input/output interface unit 1030, input device 1032 and output device 1034 may include interfaces to terminate communications links. Input device 1032 may include a keyboard. Exemplary machine 1000 may include other elements in addition to, or in place of, the elements illustrated in FIG. 10 without departing from the principles of the invention. For example, there could be one or more additional processors, input devices, output devices, storage devices, etc.

Although the elements are shown as being included in one device, functions and/or elements of the invention may be distributed over two or more devices.

Naturally, the operations of the invention may be performed on systems other than data forwarding devices and on routers other than the exemplary router. Such other systems may employ different hardware and/or software.

§4.4 EXEMPLARY APPLICATION OF THE INVENTION

FIG. 11 illustrates an advantageous application of the principles of the invention to a VPN environment. Suppose a customer wants to establish a VPN between customer edge devices (CEs) 1140 and 1150. It may be desired to establish LSP 1190 for this purpose. To make matters difficult, the LSP 1190 spans multiple network domains (or ASs) 1110, 1120 and 1130.

AS 1110 may include a service provider edge device (PE 1) 1112, ASBR 1 1116 that facilitates connectivity with other ASs, and one or more internal nodes 1114, such as LSRs. CE 1140 accesses AS 1110 via PE1 1112. Similarly, AS 1130 may include a service provider edge device (PE 2) 1132, ASBR 4 1136 that facilitates connectivity with other ASs, and one or more internal nodes 1134, such as LSRs. CE 1150 accesses AS 1130 via PE2 1132. Finally, AS 1120 may include ASBRs 1122 and 1124 facilitating communications with AS 1110 and AS 1130, respectively.

Suppose further that AS 1110 and 1130 support LSPs internally using LDP. Moreover, suppose that AS 1110 and 1130 each support LSPs via AS 1120 using BGP. In this example, desired LSP 1190 can be established as follows. PE 1, which may serve as an ingress LSR can advertise its address or prefix as a FEC element using LDP within AS 1110. Nodes 1114 can use LDP to bind its own labels to the FEC and advertise the FEC-label bindings. ASBR 1 1116, advertises the FEC to ASBR 2 1122 with a BGP message including the associations PE 1/32, label 300. ASBR 2 1122 advertises the FEC to ASBR 3 1124 with a BGP message including the associations PE1/32: RD1, label 700. ASBR 3 1124 advertises the FEC to ASBR 4 in AS 1130 with a BGP message including the associations PE 1/32, label 800.

At this point, if normal LDP is used in AS 1130, problems will be encountered. More specifically, nodes 1134 (as well as PE 2 1132) will need information about PE 1 in their routing tables in order to meet the requirements of RFC 3036. However, if an IGP (such as open shortest path first (OSPF) or Intermediate System-Intermediate System (IS-IS)) is used, these nodes 1134 will not have any information about PE 1 in their routing tables.

Although these routes could inject an entry for PE 1 in their routing tables, AS 1130 might not want to for a number of reasons. For example, AS 1130 might not trust information in BGP advertisements, perhaps because they come from an external AS over which they may have little control or trust. Even if AS 1130 did trust the route information (for example AS 1110 and 1130 might belong to the same entity), it might not want to clutter the routing tables of its nodes with information about nodes in other ASs. For example, suppose there are numerous VPNs that span multiple ASs. In such a case, the additional overhead on the routing tables of the nodes could impact performance.

The invention avoids this problem by extending LDP messaging, especially LDP label mapping messages. Under the invention, instead of testing an LDP message using the address (or prefix) of PE 1 1112, which is not discoverable by an IGP and therefore not likely to be included in routing tables of nodes in AS 1130, it could test the LDP message using an RNH address such as the address of ASBR 4 1136, which is discoverable by an IGP and therefore likely to be included in the routing tables of nodes in AS 1130. Thus, by (1) decoupling the FEC element from a routing table entry, and (2) specifying a different address on which to apply LDP tests, e.g., that of ASBR 4 1136, LDP signaling of an LSP spanning more than one network domain is enabled by the invention.

As the foregoing examples illustrates, the invention solves at least this one unmet need.

§4.5 CONCLUSIONS

As can be appreciated from the foregoing disclosure, the invention facilitates the establishment of LSPs across multiple network domains using simple extensions to LDP.

The foregoing description of embodiments consistent with the principles of the invention provides illustration and description, but is not intended to be exhaustive or to limit the invention to the precise form disclosed. Modifications and variations are possible in light of the above teachings or may be acquired from practice of the invention. For example, although a series of acts may have been described with reference to a flow diagram, the order of acts may differ in other implementations when the performance of one act is not dependent on the completion of another act. Further, non-dependent acts may be performed in parallel.

No element, act or instruction used in the description should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   a) receiving, by a first node, a message for establishing a label-switched path;
   b) determining whether or not the message includes resolution next hop information, the resolution next hop information including one of a host network address, or a network address prefix, of a second node which includes routing information to an egress node of the label-switched path;
   c) if the message does not include resolution next hop information, determining, using a first part of the message and routing information, whether or not to generate a further message to signal the label-switched path; and
   d) if the message does include resolution next hop information, determining, using the resolution next hop information and routing information, whether or not to generate a further message to signal the label-switched path.

2. The method of claim 1, wherein the message is a label-mapping message.

3. The method of claim 1, wherein the message includes a FEC-label association.

4. The method of claim 1, wherein the message includes a label distribution protocol label-mapping.

5. The method of claim 1, wherein the routing information was determined using an interior gateway protocol.

6. The method of claim 1, wherein the first node is in a first network domain, and
   wherein the second node is in the first network domain.

7. The method of claim 6, wherein the second node is an autonomous system border router.

8. The method of claim 6, wherein the first node runs an interior gateway protocol for generating routing information in the first node, and
   wherein the routing information includes an entry for the second node.

9. The method of claim 1, wherein the first part of the message includes an address or prefix of a node.

10. The method of claim 9, wherein the node is an ingress node of the label-switched path.

11. The method of claim 10, wherein the second node is in a first network domain, and
   wherein the ingress node is in a second network domain.

12. The method of claim 1, further comprising:
   d) generating, if it is determined to generate a further message to signal the label-switched path, a label mapping message.

13. The method of claim 1, further comprising:
   d) generating, if it is determined to generate a further message to signal the label-switched path, a label mapping message including an outgoing label; and
   e) creating a forwarding state binding between the outgoing label and a label in the message.

14. The method of claim 1 wherein the first part of the message includes a FEC-label association.

15. The method of claim 1 wherein the first part of the message includes a label distribution protocol label-mapping.

16. The method of claim 1 wherein the further message generated is a label mapping message.

17. A machine-readable storage device storing a machine-readable message comprising:
   a) a first field including label information stored in association with a label-switched path;
   b) a second field including forwarding equivalency class information stored in association with the label-switched path; and
   c) a third field including resolution next hop information stored in association with the label-switched path, the resolution next hop information including one of a host network address, or a network address prefix of another node which includes routing information to an egress node of the label-switched path, wherein a forwarding device, receiving the message, processes the message to (1) determine whether or not the forwarding device has a routing table entry that matches at least one of (A) the forwarding equivalency class information included in the second field, and (B) the host network address or the network address prefix included in the third field, and (2) use the label information included in the first field for forwarding data only if the forwarding device determined that the forwarding device has a routing table entry that matches at least one of (A) the forwarding equivalency class information included in the second field, and (B) the host network address or the network address prefix included in the third field.

18. The machine-readable storage device of claim 17, wherein the forwarding equivalency class information includes an address or prefix of a second node in a remote network domain, and wherein the host network address or the network address prefix included in the third field is of a first node which is in a local network domain, and wherein the data forwarding device is in the local network domain.

19. The machine-readable storage device of claim 18, wherein the first node is an autonomous system border router.

20. The machine-readable storage device of claim 17, wherein the message is a label mapping message.

21. The machine-readable storage device of claim 17, wherein the message is a label distribution protocol label mapping message.

22. Elements comprising:
a) one or more processors;
b) at least one input device; and
c) one or more storage devices storing processor-executable instructions which, when executed by one or more processors, perform a method of:
   i) receiving, by a first node, a message for establishing a label-switched path;
   ii) determining whether or not the message includes resolution next hop information, the resolution next hop information including one of a host network address, or a network address prefix; of a second node which includes routing information to an egress node of the label-switched path;
   iii) determining, using a first part of the message and routing information, whether or not to generate a further message to signal the label-switched path if the message does not include resolution next hop information; and
   iv) determining, using the resolution next hop information and routing information, whether or not to generate a further message to signal the label-switched path if the message does include resolution next hop information.

23. The elements of claim 22, wherein the message is a label-mapping message.

24. The elements of claim 22, wherein the message includes a FEC-label association.

25. The elements of claim 22, wherein the message includes a label distribution protocol label-mapping.

26. The elements of claim 22, wherein the routing information was determined using an interior gateway protocol.

27. The elements of claim 22, wherein the first node is in a first network domain, and wherein the second node is in the first network domain.

28. The elements of claim 27, wherein the second node is an autonomous system border router.

29. The elements of claim 27, wherein the first node runs an interior gateway protocol for generating routing information in the first node, and wherein the routing information includes an entry for the second node.

30. The elements of claim 22, wherein the first part of the message includes an address or prefix of a node.

31. The elements of claim 30, wherein the node is an ingress node of the label-switched path.

32. The elements of claim 31, wherein the second node is in a first network domain, and wherein the ingress node is in a second network domain.

33. The elements of claim 22, wherein the method performed when the stored processor-executable instructions are executed by the one or more processors further includes:
   v) generating, if it is determined to generate a further message to signal the label-switched path, a label mapping message.

34. The elements of claim 22, wherein the method performed when the stored processor-executable instructions are executed by the one or more processors further includes:
   v) generating, if it is determined to generate a further message to signal the label-switched path, a label mapping message including an outgoing label; and
   vi) creating a forwarding state binding between the outgoing label and a label in the message.

35. A method for use by a data forwarding device comprising:
   a) receiving, by a first node, a first message for establishing a first label-switched path;
   b) determining that the first message does not include resolution next hop information;
   c) finding a first label-switched route matching a first part of the first message;
   d) determining that an interface of the first matching label-switched route found matches an interface on which the first message was received;
   e) generating a first further message to signal the first label-switched path;
   f) receiving a second message for establishing a second label-switched path;
   g) determining that the second message includes resolution next hop information, the resolution next hop information including one of a host network address, or a network address prefix, of a second node which includes routing information to an egress node of the label-switched path;
   h) finding a second label-switched route using the resolution next hop information of the second message;
   i) determining that an interface of the second matching label-switched route found matches an interface on which the second message was received; and
   j) generating a second further message to signal the second label-switched path.

\* \* \* \* \*